(12) United States Patent
Plinck

(10) Patent No.: US 11,613,194 B2
(45) Date of Patent: Mar. 28, 2023

(54) PORTABLE DETERRENT AND SAFETY DIVIDER SYSTEM FOR VEHICLES

(71) Applicant: Matthew Aaron Plinck, San Francisco, CA (US)

(72) Inventor: Matthew Aaron Plinck, San Francisco, CA (US)

(*) Notice: Subject to any disclaimer, the term of this patent is extended or adjusted under 35 U.S.C. 154(b) by 191 days.

(21) Appl. No.: 16/842,364

(22) Filed: Apr. 7, 2020

(65) Prior Publication Data
US 2021/0309137 A1    Oct. 7, 2021

(51) Int. Cl.
*B60N 3/00* (2006.01)
*B60R 11/00* (2006.01)

(52) U.S. Cl.
CPC .............. *B60N 3/00* (2013.01); *B60R 11/00* (2013.01); *B60R 2011/0012* (2013.01); *B60R 2011/0052* (2013.01); *B60R 2011/0059* (2013.01)

(58) Field of Classification Search
CPC .............. E06B 9/00; B60N 3/00; B60R 11/00
USPC ....... 296/24.4, 24.42, 24.43, 24.46; 160/130, 160/135, 181
See application file for complete search history.

(56) References Cited

U.S. PATENT DOCUMENTS

| | | | | |
|---|---|---|---|---|
| 1,804,033 | A  * | 5/1931 | Siggins | .................... B60N 2/91 296/64 |
| 6,669,259 | B2 * | 12/2003 | Murray | ................. B60R 21/026 296/24.46 |
| 7,322,626 | B2 * | 1/2008 | Thomas | .................. B60R 21/12 296/24.3 |
| 9,174,599 | B2 * | 11/2015 | Wang | .................... B60R 21/026 |
| 10,086,724 | B2 * | 10/2018 | Geraty | ..................... B60N 2/90 |
| D852,723 | S  * | 7/2019 | Iverson | ........................ D12/400 |

* cited by examiner

*Primary Examiner* — D Glenn Dayoan
*Assistant Examiner* — Sunsurraye Westbrook
(74) *Attorney, Agent, or Firm* — Andrew S. Rapacke

(57) ABSTRACT

A barrier to partition the interior of a vehicle is disclosed, comprising an extendable barrier configured to adapt to the dimensions of the interior of a vehicle via one or more sliding tracks. At least one connection apparatus is releasably connected to the extendable barrier to at least one seat of the vehicle. The connection apparatus comprises a screw unit to compensate for varying angles within the interior of the vehicle and to retain the extendable barrier on the seat of the vehicle.

20 Claims, 8 Drawing Sheets

PORTABLE DETERRENT AND SAFETY DIVIDER SYSTEM FOR VEHICLES

TECHNICAL FIELD

The embodiments generally relate to vehicle safety devices and, more specifically, relate to a vehicle divider system that acts as a deterrent and or barrier to separate the driver and passenger regions.

BACKGROUND

With the popularity of ridesharing and the expansion of the ride-sharing economy, drivers and their passengers increase their likelihood of coming to harm as a result of the passengers they are giving rides to. Instances of harm to drivers and others in a vehicle during ridesharing have been littered across the news and deter many from using ridesharing services.

Human injury is not the only risk to drivers and passengers. It is common for animals to be present in vehicles, resulting in their injury during an accident, or potentially causing an injury to the vehicle's occupants if left uncontrolled. Due to external influences or internal desires, an animal such as a dog could roam the vehicle, posing a danger to the driver or other passengers of the vehicle. Further, the animal may be injured during an accident if they are not properly restrained within the vehicle. Similarly, non-living objects in a vehicle can also pose a danger to the driver and passengers. If the vehicle is jarred or comes to an immediate stop, objects in the vehicle can become projectiles that can strike and injure the occupants of the vehicle.

In an effort to deter passengers from harming drivers or others in the front seats of their vehicles, cab companies have installed permanent structures dividing the vehicle's cabin to separate the front seats from the rear seats. In one example, law enforcement vehicles have used barriers to protect the police officer from objects and passengers in the rear seats. These permanent structures separate the front interior of the vehicle from the back interior of the vehicle. The structures are often made of heavy-duty materials and are bolted into the interior surface or framework of the vehicle. Although the cab companies' and law enforcement's solution of dividing their vehicles to prevent human influence or harm is effective, it is not an efficient or reasonable solution for widespread incorporation into vehicles used for ridesharing, given the state of ridesharing and the ridesharing economy of today wherein users do not want a permanent barrier to be affixed to the interior of their personal vehicle.

SUMMARY OF THE INVENTION

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

Embodiments described herein provide a barrier to partition the interior of a vehicle, comprising an extendable barrier configured to adapt to the dimensions of the interior of a vehicle via one or more sliding tracks. At least one connection apparatus is releasably connected to the extendable barrier and at least one seat of the vehicle. The connection apparatus comprises a screw unit to compensate for varying angles within the interior of the vehicle and to retain the extendable barrier on the seat of the vehicle.

The embodiments provide a portable deterrent and safety divider system which may be releasably engaged within the interior of a vehicle to separate the driver cabin from the rear passenger cabin. The system may be releasably engaged to an interior component of the vehicle, such as to the front seats (i.e., the driver seat and the front passenger seat) of the vehicle to position a barrier between the front seats and rear set of the vehicle. The barrier may extend between the floor and the interior roof of the vehicle to prevent persons, animals, and/or objects from passing through the barrier.

In one aspect, the screw unit forms a clamping apparatus.

In one aspect, the screw unit comprises a hand tightened head, a ball joint, and a foot.

In one aspect, the ball joint permits the configuration of the screw unit to the interior surface of the vehicle.

In one aspect, a stabilizer bar is in communication with an apparatus arm to compensate for dimensions of the interior surface of the vehicle.

In one aspect, one or more legs are in communication with the foot.

In one aspect, the connection apparatus is configured to engage with the head rest of the seat.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1:
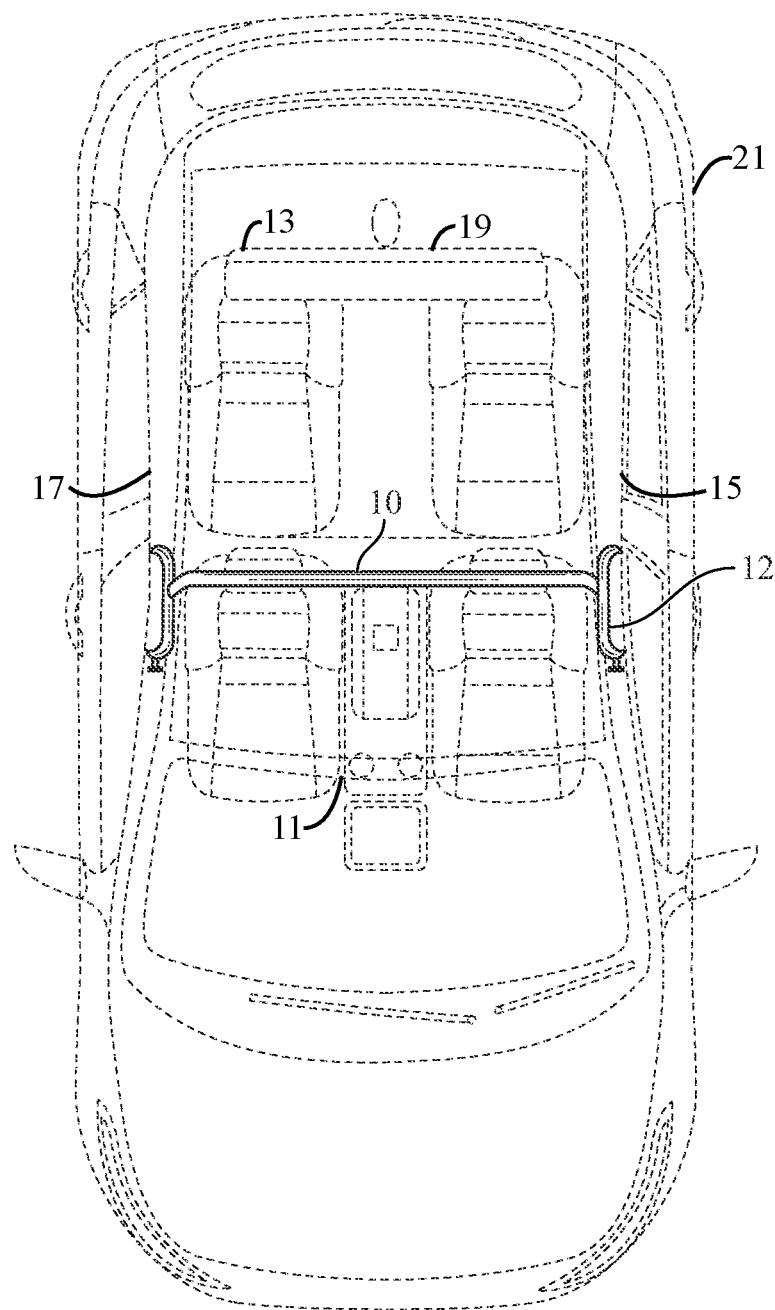
FIG. 1 illustrates a top plan view of the portable barrier and safety system, according to some embodiments.

The specific details of the single embodiment or variety of embodiments described herein are to the described apparatus. Any specific details of the embodiments are used for demonstration purposes only, and no unnecessary limitations or inferences are to be understood therefrom.

Before describing in detail exemplary embodiments, it is noted that the embodiments reside primarily in combinations of components and procedures related to the apparatus. Accordingly, the apparatus components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The specific details of the single embodiment or variety of embodiments described herein are set forth in this application. Any specific details of the embodiments are used for demonstration purposes only, and no unnecessary limitation or inferences are to be understood therefrom. Furthermore, as used herein, relational terms, such as "first" and "second," "top" and "bottom," and the like, may be used solely to distinguish one entity or element from another entity or element without necessarily requiring or implying any physical or logical relationship, or order between such entities or elements.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

In general, the embodiments provided herein relate to a portable deterrent and safety divider system which may be releasably engaged within the interior of a vehicle to separate the driver cabin from the rear passenger cabin. The system may be releasably engaged to an interior component of the vehicle, such as to the front seats (i.e., the driver seat and the front passenger seat) of the vehicle to position a barrier between the front seats and rear seats of the vehicle. The barrier may extend between the floor and the interior roof of the vehicle to prevent persons, animals, and/or objects from passing through the barrier.

As used herein, the term "objects" may refer to passengers, animals, and non-living objects which may be transported within the vehicle.

As used herein, the term "vehicle" may refer to motor vehicles, recreational vehicles, boats, airplanes, trains, and other forms of vehicles known in the arts.

FIG. 1 illustrates an example of a barrier 10 according to various embodiments of the present invention. Attached to the barrier 10 is a connection apparatus 12 that can affix to various components of the vehicle 21. In some embodiments, a barrier 10 comprises acrylic or poly carbonate and includes a sliding apparatus to compensate for an interior width. The connection apparatus 12 may be affixed to the center front seat belt housing and includes a stability component. The barrier 10 separates the front portion 11 and the rear portion 13 of the vehicle to prevent the passage of persons, animals, or other objects. The barrier 10 extends from the first side 15 to the second side 17 of the interior 19 of the vehicle 21 and may be adjustable to accommodate various vehicles sizes, shapes, and configurations.

In some embodiments, the barrier may be solid, such as by using plastics, metals, etc. to completely block the passage of objects therethrough. Alternatively, the barrier may be perforated to allow communication between the driver and rear-seated passengers, as well as to permit the flow of air through the barrier.

In some embodiments, the barrier 10 may be retractable to allow the user to raise, lower, collapse, expand, or compress the barrier 10 to fittingly engage the barrier 10 to the interior dimensions of the vehicle 21. Further, the barrier 10 may be easily and readily disengaged to permit the user to remove the barrier 10 when it is not needed. For example, the user may require the barrier 10 during transit of an unknown passenger, while the user may disengage the barrier 10 after transit of the unknown passenger.

Figure 2:
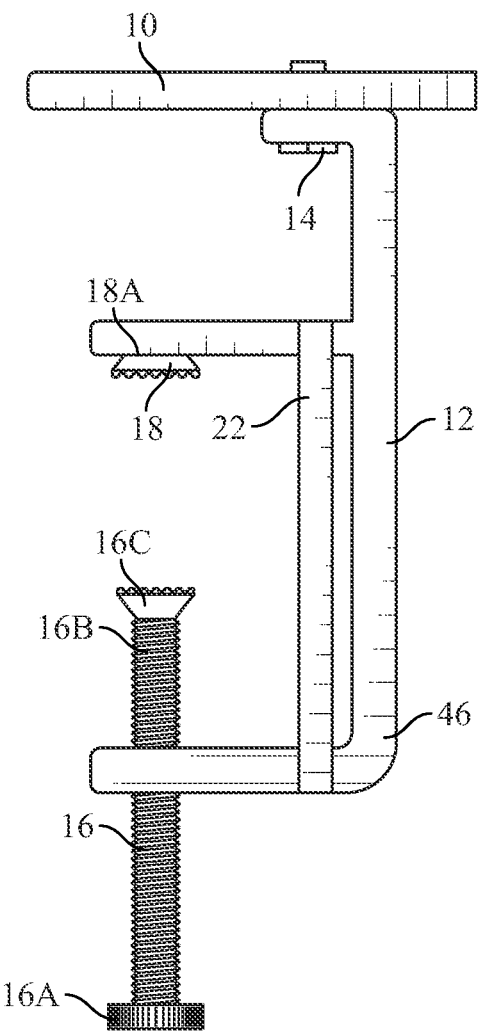
FIG. 2 illustrates a side plan view of the attachment device, according to some embodiments.

Referring now to FIG. 2, in some embodiments, the barrier 10 will be connected to a connection apparatus 12 by a connector 14. The arm 46 comprises a clamping apparatus having a screw unit 16 with a hand tightened head 16A and a ball joint 16B to compensate for angles and for contour, connected to the foot 16C. The foot 16C comprises a rubber in a corrugated configuration to facilitate the grip thereof. On the bottom of the clamp portion of the apparatus arm there is another foot 18, comprising the rubber in a corrugated arrangement to facilitate the grip thereof. The foot 18 is connected to a ball joint 18A to compensate for angles and for contour of the interior of the vehicle. For system stability, a stabilizer bar 22 will be connected to the clamp portion of the apparatus arm 46 to compensate for dimensions of vehicle component(s) (such as the front seat-belt housing).

Figure 3:
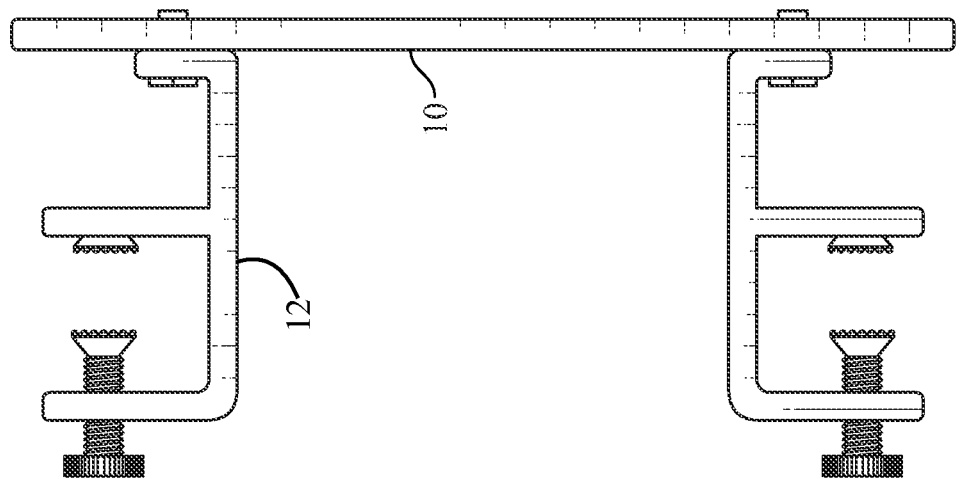
FIG. 3 illustrates a side elevation view of the attachment device engaged with the portable barrier and safety system, according to some embodiments.

FIG. 3 depicts an example of a portable deterrent and safety divider system, including a barrier 10. In some embodiments, the connection apparatus 12 is affixed to the barrier 10. In some embodiments, the barrier 10 may have holes to decrease the weight of the overall system and allow for airflow. Further, the holes may allow for communication between the passengers separated by the barrier.

Figure 4:
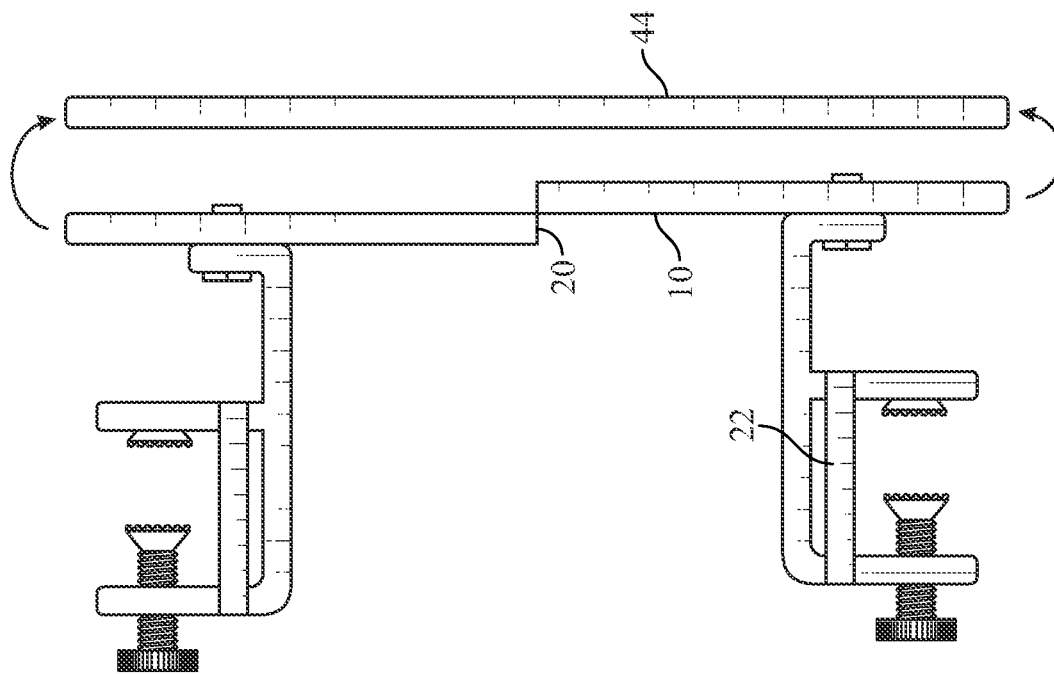
FIG. 4 illustrates a side elevation view of the attachment device engaged with the portable barrier and safety system, according to some embodiments.

FIG. 4 depicts an example of the portable deterrent and safety divider system. In some embodiments, the barrier 10 includes a division point (2-piece) 20 housed in a frame with one or more sliding tracks 44. The sliding track frame housing 44 may be constructed of rubber, plastic, wood, metal, or any other suitable material and combinations thereof. The two-piece system of the sliding track frame housing 44 allows for collapsing the system for increased portability when not in use or when in a storage configuration. Expanding and collapsing compensates for interior vehicle dimensions to permit the device to be positioned in various vehicles without being restricted by overall size or interior design of the vehicle. In another embodiment, the barrier 10 is a single element with and is attached to the connection apparatus 12.

Figure 5:
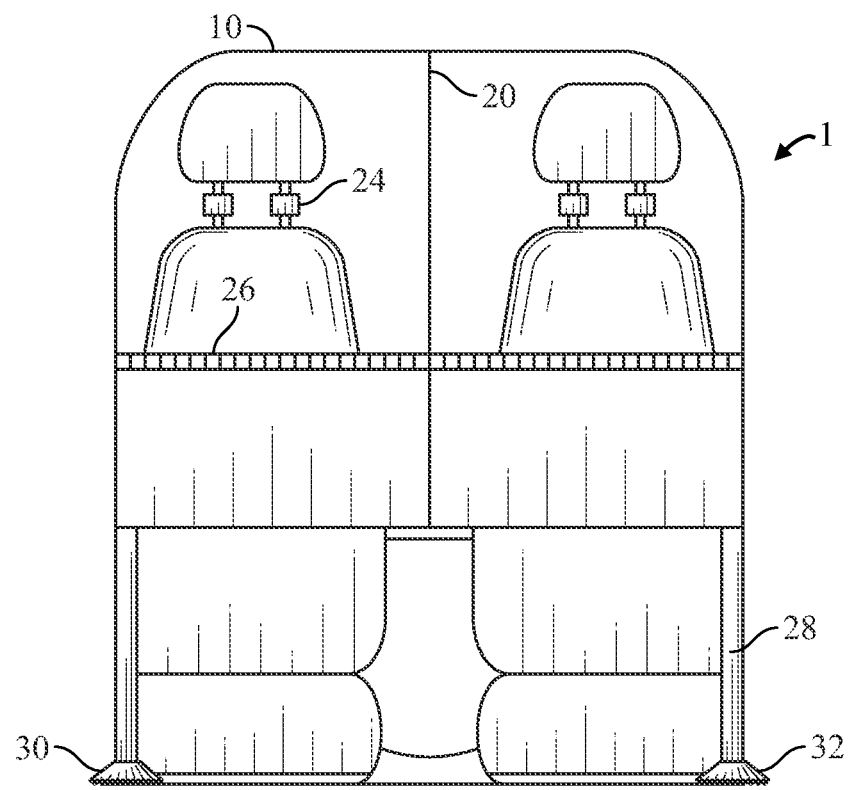
FIG. 5 illustrates a front elevation view of the portable barrier and safety system, according to some embodiments.

FIG. 5 illustrates an example of the portable deterrent and safety divider system 1 shown with a barrier 10, a division 20, an attachment apparatus 24, and hinge 26 to compensate for angle. In this example, the hinge 26 allows the barrier 10 to move freely allowing the lower and upper portion of the system 1 to compensate for angle(s), dimensions, and contour of interior components and or structures. This illustration depicts a connecting and or attachment apparatus 24 that can attach to components and or structures of the vehicle for the purpose of stabilizing the system 1. The apparatus 24 may be made from rubber, plastic, wood, metal, leather, or any other suitable material. Further, the apparatus 24 may consist of straps, clamps, ties, or any other suitable connecting apparatus that in the embodiments of this example will connect to components and or structures of a vehicle's head rest. In this example the lower half of the system 1 comprises at least one leg 28, which is adjustable to compensate for varying heights of the interior of the vehicles and to enhance stability of the system 1.

In some embodiments, the one or more legs 28 have a push and lock apparatus to hold a desired length of legs in place. The system may have a telescopic leg apparatus to allow for easy adjustment of the length of the legs in various applications of the system. In some embodiments, at least one foot 30 is connect to the legs 28 by a ball joint 32; this ensures the at least one foot 30 remains flat while at angles. The legs 28 and at least one food 30 may be made from rubber, plastic, wood, metal, or any other suitable material.

Figure 6:
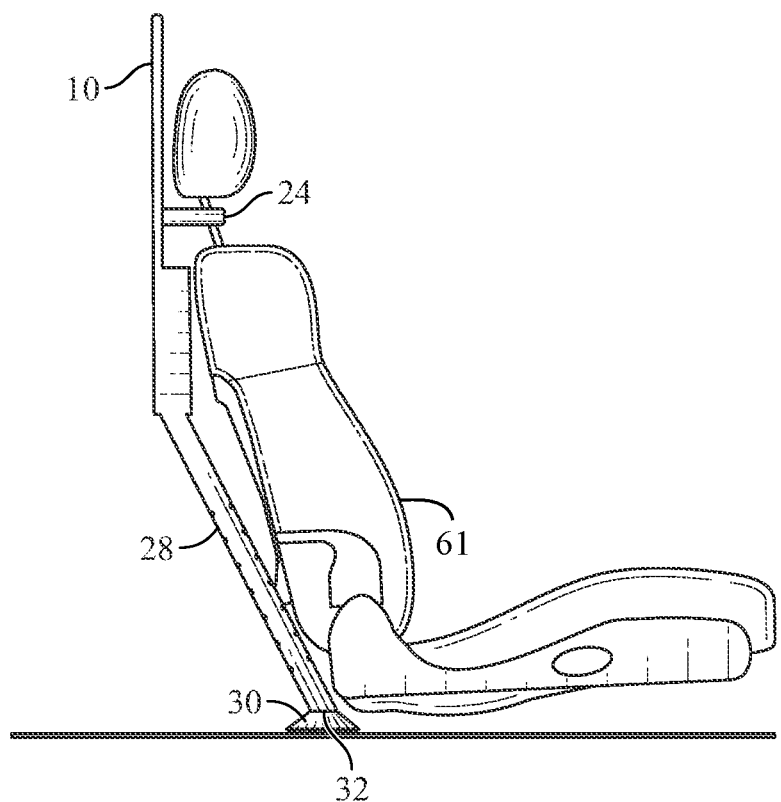
FIG. 6 illustrates a side elevation view of the seat engaged with the portable barrier and safety system, according to some embodiments.

FIG. 6 illustrates a side view example of a deterrent and safety divider according to various embodiments wherein the barrier 10 is releasably engaged with at least one seat 61. In one example, barrier 10 is configured with attachment apparatus 24 connecting it to components and or structures of a vehicle's head rest. It also illustrates the lower half of the system according to various embodiments of the present invention, wherein legs 28 are angled for contour and stability with the attached at least one foot 30 connected by ball joint 32, and the at least one foot 30 lying flat on vehicle's floor.

Figure 7:
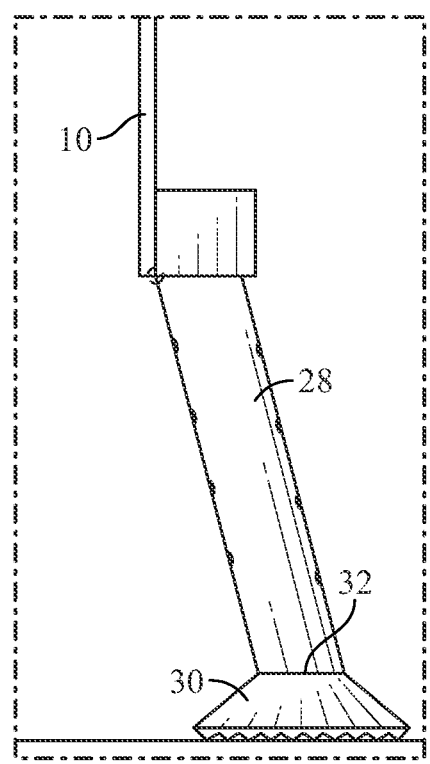
FIG. 7 illustrates a side elevation view of the leg holes for the attachment apparatus, according to some embodiments.

FIG. 7 illustrates a detail view of the deterrent and safety divider according to various embodiments of the present invention. Barrier 10 is connected to a lower portion of system 1 and legs 28, which are connected to the at least one foot 30 and the ball joint 32. In the illustrated embodiment, holes are incorporated along the length of the legs 28 as part of a push and lock apparatus to increase and decrease the height of the legs 28.

Figure 8:
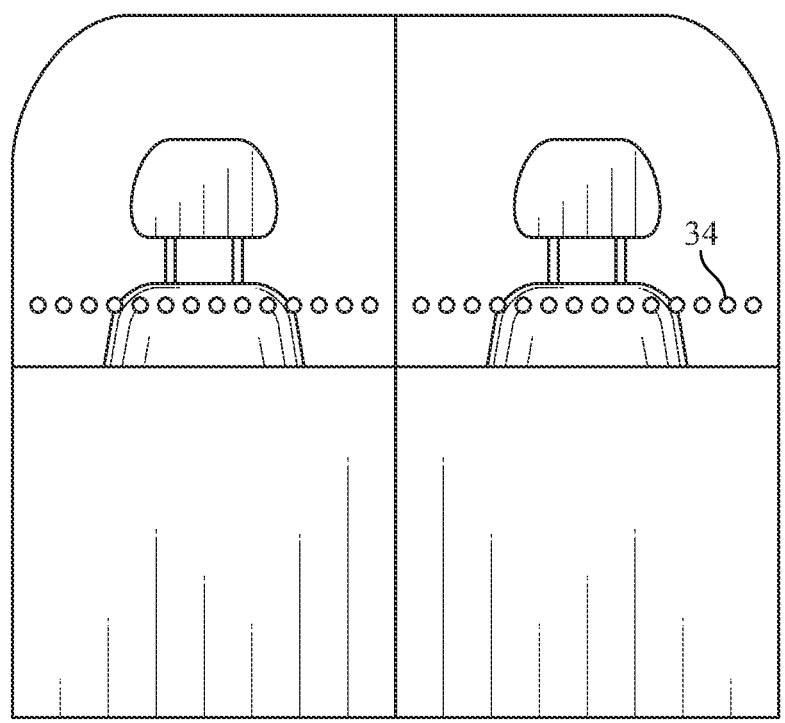
FIG. 8 illustrates a side elevation view of the portable barrier and safety system including the holes and sliders.

FIG. 8 illustrates an example of a portable deterrent and safety divider system according to various embodiments of the present invention. In some embodiments, the barrier 10 (FIG. 5) has perforations 34 running horizontally to act as receivers for attachment apparatus 24 (FIG. 5) in order to compensate for varying vehicle dimensions. The holes 34 hold attachment apparatus 24, which attaches to components or structures of a vehicle's head rest.

Figure 9:
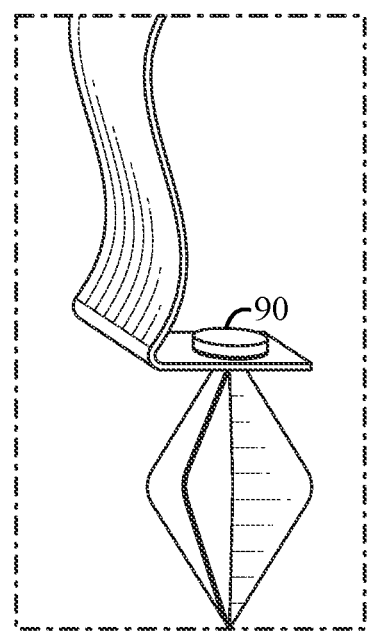
FIG. 9 illustrates a push locking mechanism, according to some embodiments.

FIG. 9 depicts an exemplary attachment apparatus 24 (FIG. 5) including a push button apparatus 90 which may be used to connect the attachment apparatus 24 (FIG. 5) to a plurality of perforations 34 (FIG. 8). In some embodiments, the protective barrier and safety system contain a button and claw-like structure that could be pushed into holes 34 (FIG. 8) to lock the apparatus 24 (FIG. 5) in place at a location along the horizontal perforation 34 (FIG. 8).

Figure 10:
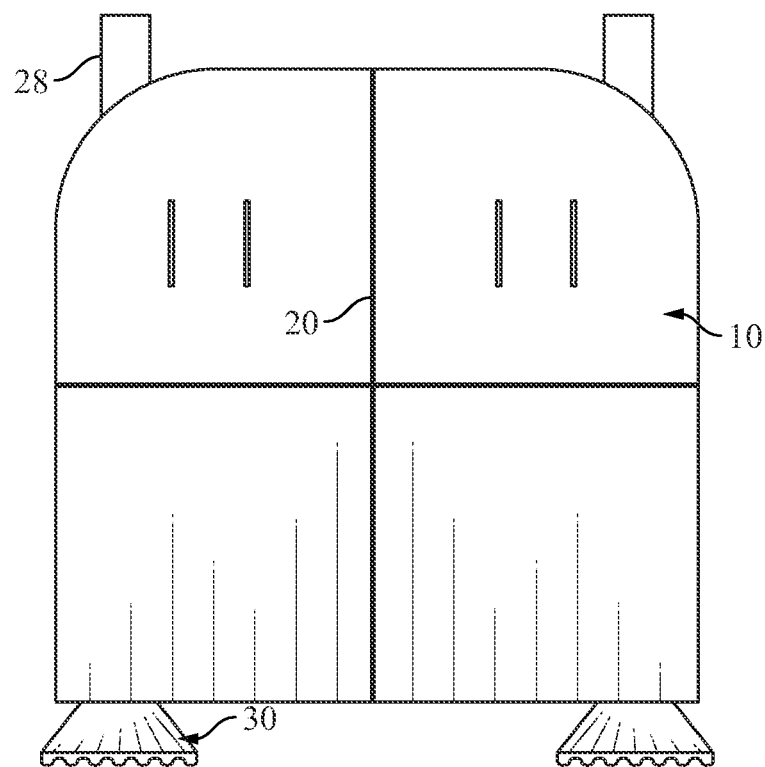
FIG. 10 illustrates a side elevation view of the portable barrier and safety system in a collapsed configuration, according to some embodiments.

FIG. 10 depicts an example of a deterrent and safety divider in a compact form according to various embodiments of the present invention, comprising a barrier 10 with a division 20, a plurality of retracted legs 28, and the at least one foot 30 for visual representation of how system may look while in a compacted form.

Figure 11:
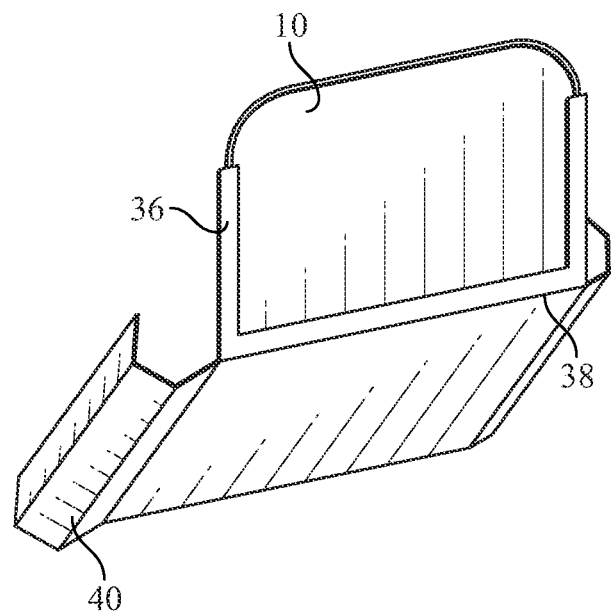
FIG. 11 illustrates a perspective view of contoured connector for a grip, clamp, or adhering component, according to some embodiments.

FIG. 11 depicts an exemplary embodiment of the deterrent and safety divider comprising a shield or barrier 10, slid into a structure or component 36 that may be molded and may be made from rubber, plastic, wood, metal, or any other suitable material. The system contains a rigid angle or free-swinging hinge 38 for contour and/or structural integrity and an apparatus 40, which may be comprised of a clamp, cuff, strap or other like components and or structures to affix to components and or structures of a vehicle.

Figure 12:
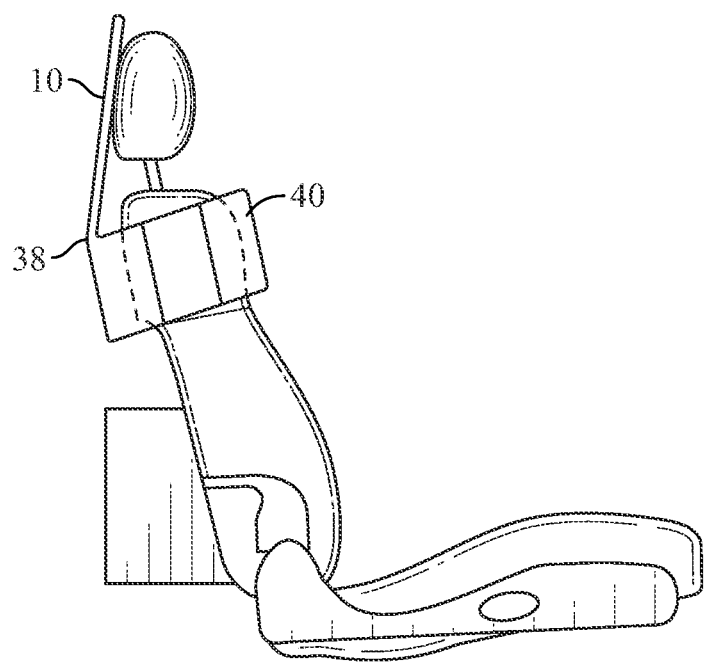
FIG. 12 illustrates a side elevation view of the seat engaged with the contoured connector, according to some embodiments.

FIG. 12 illustrates a side view example of a portable deterrent and safety divider system according to various embodiments of the present invention. The barrier 10 may be connected to an angled portion 38 which is then connected to a grip, clamp, or adhering apparatus 40 connected to the seat of a vehicle. The grip may aid in the adjustment of the system or transportation of the system when in a storage configuration.

Figure 13:
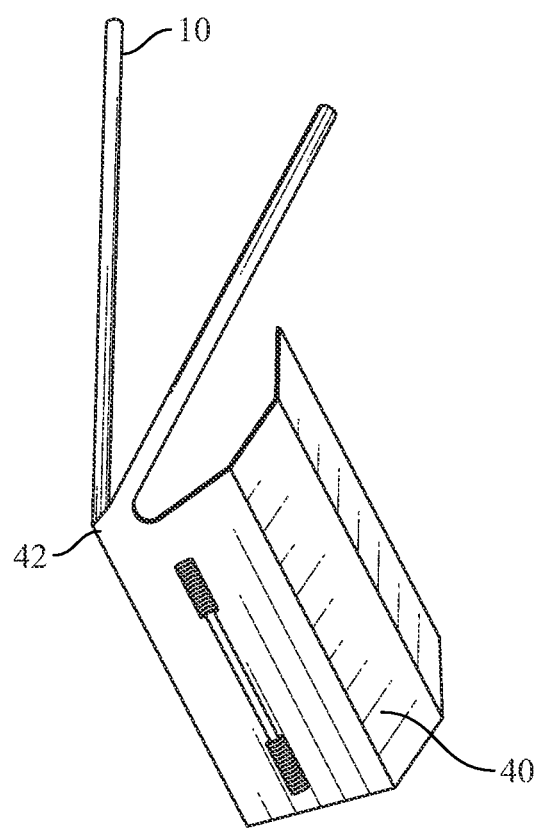
FIG. 13 illustrates a perspective view of the portable barrier and safety system and pivoting function thereof, according to some embodiments.

FIG. 13 illustrates a side view example of a portable deterrent and safety divider system according to various embodiments of the present invention. The barrier 10 may be connected to a pivoting apparatus 42, which is then connected to a grip, clamp, or adhering apparatus 40. Further, the system comprises a pivoting apparatus that can change the angle and then hold in said angle to compensate for varying contour and vehicle dimensions.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. A barrier to partition the interior of a vehicle, comprising:
   an extendable barrier configured to adapt to the dimensions of the interior of a vehicle, via one or more sliding tracks;
   at least one connection apparatus to releasably connect the extendable barrier to at least one seat of the vehicle, the connection apparatus comprising a screw unit to compensate for varying angles within the interior of the vehicle, the screw unit to retain the extendable barrier on the seat of the vehicle; and
   at least one leg connected to a foot, wherein the foot lies flat on a floor of the vehicle.

2. The barrier of claim 1, wherein the screw unit forms a clamping apparatus.

3. The barrier of claim 2, wherein the screw unit comprises a hand tightened head, a ball joint, and a foot.

4. The barrier of claim 3, wherein the ball joint permits the configuration of the screw unit to the interior surface of the vehicle.

5. The barrier of claim 4, wherein a stabilizer bar is in communication with an apparatus arm to compensate for dimensions of the interior surface of the vehicle.

6. The barrier of claim 5, wherein the at least one leg is angled.

7. The barrier of claim 6, wherein the connection apparatus is configured to engage with the head rest of the seat.

8. A barrier to partition the interior of a vehicle, comprising:
- an extendable barrier configured to adapt to the dimensions of the interior of a vehicle, via one or more sliding tracks;
- at least one connection apparatus to releasably connect the extendable barrier to at least one seat of the vehicle, the connection apparatus comprising a screw unit to compensate for varying angles within the interior of the vehicle, the screw unit to retain the extendable barrier on the seat of the vehicle;
- a push button apparatus to permit the releasable engagement of the extendable barrier to the at least one seat of the vehicle; and
- at least one leg connected to a foot, wherein the foot lies flat on a floor of the vehicle.

9. The barrier of claim 8, wherein the screw unit forms a clamping apparatus.

10. The barrier of claim 9, wherein the screw unit comprises a hand tightened head, a ball joint, and a foot.

11. The barrier of claim 10, wherein the ball joint permits the configuration of the screw unit to the interior surface of the vehicle.

12. The barrier of claim 11, wherein a stablilizer bar is in communication with an apparatus arm to compensate for dimensions of the interior surface of the vehicle.

13. The barrier of claim 12 wherein the at least one leg is angled t.

14. The barrier of claim 13, wherein the connection apparatus is configured to engage with the head rest of the seat.

15. A barrier to partition the interior of a vehicle, comprising:
- an extendable barrier configured to adapt to the dimensions of the interior of a vehicle, via one or more sliding tracks to permit the extension and retraction of the extendable barrier, the extendable barrier sufficient to prohibit the passage of objects therethrough;
- at least one connection apparatus to releasable connect the extendable barrier to at least one seat of the vehicle, the connection apparatus comprising a screw unit to form a clamping apparatus to compensate for varying angles within the interior of the vehicle, the screw unit to retain the extendable barrier on the seat of the vehicle; and
- at least one leg connected to a foot, wherein the foot lies flat on a floor of the vehicle.

16. The barrier of claim 15, wherein the screw unit comprises a hand tightened head, a ball joint, and a foot.

17. The barrier of claim 16, wherein the ball joint permits the configuration of the screw unit to the interior surface of the vehicle.

18. The barrier of claim 17, wherein a stabilizer bar is in communication with an apparatus arm to compensate for dimensions of the interior surface of the vehicle.

19. The barrier of claim 18, wherein the at least one leg is angled.

20. The barrier of claim 19, wherein the connection apparatus is configured to engage with the head rest of the seat.

* * * * *